United States Patent [19]

Böhmer et al.

[11] 4,330,441
[45] May 18, 1982

[54] SOLVENT-SOLUBLE SUBSTANCES CHARACTERIZED IN THAT WATER-SOLUBLE CELLULOSE ETHERS ARE CHEMICALLY BONDED TO WATER-SOLUBLE, AT LEAST PREDOMINATELY SYNTHETIC POLYMERS CONTAINING ACRYLIC UNITS

[75] Inventors: Branislaw Böhmer; Lutz Hoppe; Klaus Szablikowski; Dieter Kudora; Rudolf Behn, all of Walsrode, Fed. Rep. of Germany

[73] Assignee: Wolff Walsrode Aktiengesellschaft, Leverkusen, Fed. Rep. of Germany

[21] Appl. No.: 107,094

[22] Filed: Dec. 26, 1979

[30] Foreign Application Priority Data

Jan. 3, 1979 [DE] Fed. Rep. of Germany ....... 2900110

[51] Int. Cl.³ ............... C08B 37/00; C04B 7/352; C04B 7/354; C04B 11/22

[52] U.S. Cl. .................. 525/54.23; 106/90; 106/115; 252/316; 525/54.21; 523/457
[58] Field of Search ..... 260/17 A, 17.4 ST, 17.4 UC, 260/9, 17.4 GC; 106/90, 115; 252/316

[56] References Cited

U.S. PATENT DOCUMENTS 4,028,290 6/1977 Reid ............... 260/17.4 GC
4,051,086 9/1977 Reid ............... 260/17.4 GC
4,251,404 2/1981 Simms ............ 260/17 A

FOREIGN PATENT DOCUMENTS

2305452 10/1976 France ............ 260/17.4 GC

*Primary Examiner*—John Kight, III
*Assistant Examiner*—Nathan M. Nutter
*Attorney, Agent, or Firm*—Connolly and Hutz

[57] ABSTRACT

Water soluble macromolecular substances obtained by reacting cellulose derivatives, a crosslinking agent and a synthetic resin, preferably an acrylic homo- or copolymer.

13 Claims, 3 Drawing Figures

SOLVENT-SOLUBLE SUBSTANCES CHARACTERIZED IN THAT WATER-SOLUBLE CELLULOSE ETHERS ARE CHEMICALLY BONDED TO WATER-SOLUBLE, AT LEAST PREDOMINATELY SYNTHETIC POLYMERS CONTAINING ACRYLIC UNITS

This invention relates to substances soluble in solvents, preferably water, which substances are obtained from compounds of polysaccharide derivatives with at least predominantly synthetic resins, to a process for the preparation of these solvent-soluble substances and to their use.

In the known art many trials have been made to influence the solubility of polysaccharide derivatives, especially of cellulose derivatives by modification of these substances.

Thus according to the German Offenlegungsschrift No. 1,953,121 a process for improving cellulose derivatives by grafting with polymeric compounds, such as methyl methacrylate is disclosed, in order to obtain end products which have hydrophilic and absorbent properties.

In the U.S. Pat. No. 3,682,856 is taught that cellulosic substances which are modified with polyacrylate compounds become substantially more efficient in their capacity as thickeners in aqueous systems if the water-soluble macromolecular end product is subjected to a simple grinding process to size reduce the material after it has been dried. If the product is ground down, it still acts as thickener even, in quantities of as little as 0.1% by weight. No mention is made in this document of the use of this substance as a cross-linking agent.

According to German Auslegeschrift No. 2,146,709 = GB PS 1340 159, bond strength and water resistance are only obtained by adding individual additives, such as methyl cellulose, malamine-formaldehyde condensation products and a polyacrylamide to a mortar. No chemical reaction between these three components is mentioned.

German Offenlegungsschrift No. 2,435,558 discloses a three-component mixture which is substantially water-soluble, although this is intended for ceramic screen printing inks. The bifunctional glycol compounds in this mixture serve as solvents for vinyl polymers to which water-soluble cellulose ethers such as methyl cellulose, hydroxyethyl cellulose, hydroxypropyl cellulose, methyl hydroxypropyl cellulose, methyl hydroxyethylcellulose or alkali metal salts of carboxymethyl cellulose are added. The said document makes no mention of any chemical reaction between these three components.

German Offenlegungsschrift No. 2,436,555 (=GB-PS 1495 845) describes soluble substances obtained from compounds of polysaccharide derivatives with at least predominantly synthetic resins in which acrylic polymers already in a polymerized state are chemically linked to polysaccharide ethers by grafting.

In paragraph 3 on page 1 of the description, the teaching is given that, in contrast to the previous state of the art, not only monomers of unsaturated organic compounds but also polymeric vinyl and/or acrylic compounds can now be directly applied to starch ethers without initiators and linked chemically to them. The reaction products of the polysaccharide ethers and methacrylic acid copolymers are completely soluble in water. Polymers mentioned as water-soluble starting components include inter alia methacrylic acid copolymers, acrylic acid/acrylonitrile copolymers, polyacrylic acid, sodium polyacrylate, an ammonium salt of a polymethacrylate and partially hydrolysed polyvinyl alcohol. In said Offenlegungsschrift it is also stated that in contrast to macromolecular compounds which are merely obtained as mixtures, the macromolecular reaction substance now obtained is a true chemical linkage compound in the form of a graft polymer between polysaccharide ethers on the one hand and polyacrylate compounds on the other, which is far superior to the aforesaid mixed substances in its capacity to thicken in water, its pourability, its dispersibility in water and its swelling power. However, the document gives no information as to the possibility of applying the findings about starch ethers to cellulose ethers.

Other developments in the improvement of the properties, in particular the water retention capacity of cross-linked cellulose ethers which are soluble in water, use bis-acrylamidoacetic acid and epichlorohydrin, among other compounds, as the cellulose ether linking substances. The resulting products are, however, unsuitable in the numerous cases where macromolecular products modified by linkage are required to be completely water-soluble.

German Offenlegungsschrift No. 2,647,420=US-PS No. 4028 290 discloses interesting further developments in the art in that in a process for the preparation of a modified polysaccharide such as carboxymethylcellulose or hydroxyethylcellulose, an effective crosslinking of the grafted polysaccharide molecules with synthetic polymer accompanied by considerable tangling and knotting of the crosslinked vinyl polymer molecules contributes to the stability of the polysaccharide matrix. Water soluble substances are not obtained.

The process described in German Offenlegungsschrift No. 2,550,033 for the preparation of cellulose ethers capable of taking up water leads to an only partially water-soluble product when the linking agent, methylene-bis-methacrylamide is used. The subject matter of the above mentioned German Offenlegungsschrift cannot be used for any of those applications in which complete solubility in water of this water-retaining substance is required.

The process according to German Offenlegungsschrift No. 2,712,043=US-PS No. 4051 086 again does not lead to completely water-soluble polymers. In said Offenlegungsschrift, polyacrylamide is grafted on cellulose derivatives such as carboxymethylcellulose, hydroxyethylcellulose or cross-linked hydroxyethylcellulose and grafted with a divinylcompound such as, for example, methylene-bis-acrylamide Glyoxal is then once more applied to the already cross-linked polymer with the intention of again considerably increasing the absorption capacity of the resulting macromolecular substance. Such products, however, are not suitable for any applications which require complete water-solubility of these macromolecular substances.

Aside from these numerous attempts to obtain water-insoluble macromolecular products with a high water-retention capacity mainly by chemical reactions, experiments continued in the direction of achieving a suitable improvement in properties by mixing the starting products rather than by carrying out chemical reactions. Thus in the German Offenlegungsschrift No. 2,756,499=US-PS No. 4082 563 and US-PS No. 4,142,911 a water-soluble cellulose either such as, for example, cellulose methyl ether, hydroxypropyl methyl cellulose, hydroxypropyl cellulose or hydroxyethyl cellulose may be mixed with other water-soluble polymers, such as polyvinyl alcohol or polyacrylamide in order to obtain optimum properties. With these mixtures the creeping property of mortar should be improved.

In the German Offenlegungsschrift No. 2,819,522 the chemical linking of oligosaccharide ethers with macroporous, three-dimensional copolymers of hydroalkyl acrylates or hydroxy-alkylmethacrylates through linking agents taken from the group of divinyl or polyvinyl compounds in the form of epichlorohydrins, ethylene-bis-acrylamides and other suitable linking agents is described. In addition to the oligosaccharide ethers already mentioned above, natural modified polysaccharides, partly in the cross-linked form, as carriers for (a) the cross-linking agent and (b) the polyacrylate substance linked to it. The macroporous three-dimensional copolymers mentioned are hydrophilic. Whether the technical teaching given there can in fact be applied to the preparation of substances which are substantially different and certainly do not include oligosaccharides or their ethers is very doubtful. The substances described there are used for quite different purposes, namely as specific sorbents for isolating physiologically and biocatalytically active substances. It is therefore an object of the present invention to provide polysaccharide derivatives which are not only completely water soluble, but have also an optimum capacity for dispersion, suspension and water retention.

These macromolecular substances modified according to the invention are thus composed of three main structural constituents, namely 1. polysaccharide derivatives, 2. resins which are at least predominantly synthetic and 3. a cross-linking agent which permanently joins the polysaccharide derivatives to the synthetic resins by a chemical bond so that the product, although completely water-soluble, still has an optimum capacity for dispersion, suspension and water-retention.

Although water-soluble cellulose ethers are claimed here as polysaccharide derivatives, other cellulose derivatives could in principle also be used. The invention can be realised particularly advantageously with macromolecular substance whose water-soluble cellulose ether component and substances having glucosidically linked recurrent structural units corresponding to the following formula:

in which y represents at least 2; $R_1$ has one of the following meanings:
1. —$CH_2$—O—$CH_3$ (methyl substitution)
2. —$CH_2$—O—$CH_2$—$CH_2$—OH (hydroxyethyl substitution)
3. —$CH_2$—O—$CH_2$—CH—OH (hydroxypropyl substitution)
and $R_2$ or $R_3$ the same or different has one of the following meanings:
1. —O—$CH_3$ (methyl substitution)
2. —O—$CH_2$—$CH_2$—OH (hydroxyethyl substitution)
3. —O—$CH_2$—CH—OH (hydroxypropyl substitution)
4. —$CH_2$—$CH_2$—O—$CH_3$ (hydroxyethylmethyl substitution)
5. —O—$CH_2$—CH—O—$CH_3$ (hydroxypropylmethyl substitution)
6. —O—$CH_2$—COONa sodium carboxymethyl substitution.

The at least bifunctional cross-linking agent used is most preferably, a substance which is in the form of structural units selected from epichlorohydrin, glyoxal, glycidyl, paraformaldehyde, glutaric dialdehyde, maleic acid anhydride, epichlorohydrin polydiol, glycidyl methacrylate, N-methylol-acrylamide, N-methylene-bis-acrylamide, ethylene glycol dimethacrylate, tetrallyloxyethane, tetraallyloxymethane, glyoxal-bis-acrylamide, bis-acrylamidoacetic acid, acrylamidoglycollic acid, epichlorohydrin-bis-phenol-A reaction products and sodium hypochloride.

The third water-soluble synthetic polymer component containing acrylic units may advantageously be a substance having recurrent structural units, which substance is selected from homo-and copolymers of acrylamide, acrylamide derivatives, acrylic acid, methacrylic acid, 2-acrylamido-2-methylpropane sulphonic acid, vinyl caprolactam, vinyl pyrrolidone, acrylic acid esters, methacrylic acid esters, acrylonitrile which may be partly hydrolysed, acrylonitrile derivatives, graft copolymers of acrylamide on methyl cellulose, graft copolymers of acrylamide and acrylic acid on methyl cellulose alone or in a mixture with polymer compounds of sodium alginate, of ethylene glycol, of propylene glycol, of vinyl alcohol and of amides.

Macromolecular substances according to the invention which are particularly suitable for use in the building industry, especially for the manufacture of gypsum and cement plasters, are those which contain, as their water-soluble cellulose ether component, a substance selected from methyl cellulose, hydroxyethyl cellulose, hydroxypropymethylcellulose or carboxymethyl cellulose, alone or in admixture with sodium chloride, and in which the substance used as cross-linking agent is in the form of structural units selected from epichlorohydrin, glyoxal, sodium hypochlorite, glyoxal-bis-acrylamide, glutaric dialdehyde, glycidyl methacrylate and tetraallyloxymethane, and in which the water-soluble polymer component is a substance in the form of recurrent structural units selected from an acrylamide homopolymer, an acrylamide-acrylic acid-maleic acid anhydride copolymer, an acrylamide-acrylic acid-acrylonitrile copolymer, an acrylamide-methyl cellulose graft polymer and an acrylamide-acrylic acid-methylcellulose graft polymer alone or in admixture with polymer compounds of vinyl alcohol, of ethylene glycol and of a condensation product of bisphenol A and epichlorohydrin.

The best results, also for the special use of these water-soluble macromolecular substances according to the invention, are obtained when the proportion of the synthetic polymer component based on the total weight of cellulose ether component and polymer content, is from 1 to 25% by weight, preferably from 1.8 to 9.0% by weight, and the proportion of the at least bifunctional cross-linking component, based on the monomer unit in the at least predominantly synthetic polymer, is from 1 to 25 mol %, most preferably from 1.4 to 20 mol

%. Suitable cellulose ether components for the water-soluble macromolecular substance according to the invention which are readily available on the market are methyl cellulose, hydroxyethyl cellulose, hydroxypropyl methyl cellulose and the sodium salt of carboxymethylcellulose.

As will be seen from the Examples given later in the description, polyacrylamide is particularly preferred according to the invention as the synthetic polymer unit in the macromolecule according to the invention (see Examples A-1 to A-10, A-22, A-23, A-30, A-36, A-37, B-5 and B-8 to B-10). When this polyacrylamide is used as structural unit in the macromolecular substance according to the invention, the chemical three-component compound may be represented by the following formula, in which CE represents cellulose ether and XB represents the cross-linking substance:

In this structural formula, which has been partially simplified, n represents the degree of polymerisation of the polyacrylamide unit.

The macromolecular substances according to the invention need not necessarily have the structure represented by the above, simplified, structural formula but may have various other structures, including the one represented below, in which the polyacrylamide unit is not only chemically bonded to the cellulose ether through a cross-linking bridge but itself serves as cross-linking bridge in the polyacrylamide unit for chemically bonding or coupling or cross-linking two adjacent macromolecules of cellulose ether chains:

In this structural formula, n represents the degree of polymerisation of polyacrylamide. The symbols XB and BX are shorthand formulae for the cross-linking agent.

It is recommended for the production of the inventive substances that the cellulose ethers should be prepared by the usual method described inter alia in Ullmanns Encyklopädie der Technischen Chemie, 4th Edition, Volume 9, pages 200 to 207 and this water-soluble component should, either before or after it has been desalted, be chemically reacted in alkaline medium at an elevated temperature with the predominantly synthetic polymerisation component which has already been mixed with the cross-linking component, and the macromolecular substance thus formed from the cellulose ether and the cross-linking component and polymer component should then be dried, ground and separated according to the particle sizes by sieving.

The process according to the invention outlined in general terms above thus makes it possible for the methods long known for the preparation of cellulose ethers to be fully utilised in the process according to the invention. The modification of the cellulose ethers in the course of the process of the invention is preferably carried out before or after removal of the salts from the cellulose ethers.

If, according to the invention, modification of the cellulose ether component is carried out after the known desalting procedure, it is recommended that after removal of the salts, the purified cellulose ether should be mixed homogeneous by kneading with the polymer component to which the cross-linking component has previously been added, so that a uniform chemical reaction then takes place in which the macromolecular substance is formed from these three components. The resulting reaction product is subsequently dried, ground and sieved to separate the required particle sizes. Particularly high yields are obtained if, after desalting of the cellulose ether, 1 to 25 mol % of the cross-linking agent, based on the sum of mols of monomer units in the polymer and mols of cross-linking agent, and 1 to 15% by weight of the at least predominantly synthetic polymer, based on the total weight of the cellulose ether and the polymer, are brought together and the three reactants are then kneaded homogeneous and thus reacted together for a period of 2 to 7 hours at a temperature of 50° to 90° C. and at an alkaline pH of 8 to 12, optionally under an inert gas atmosphere. The above mentioned macromolecular substance thereby obtained as reaction product according to the invention is then dried at 75° to 90° C. and converted into a water-soluble form suitable for use, by grinding it down to a particle size of 0.1 to 250 μm. It is particularly advantageous to bring 1.4 to 20 mol % of the linking agent and 3.5 to 12.5% by weight of the polymer together with the desalted cellulose ether component and to homogenise the mixture by kneading it for 3 to 6 hours at a temperature of 70° to 85° C. at an alkaline pH of 9.5 to 11 under an inert gas atmosphere and subsequently to dry the resulting reaction product according to the invention at 78° to 82° C. and finally convert it into the water-soluble macromolecular substance suitable for use by grinding it to a particle size of 20 to 100 μm.

If, on the other hand, one wishes to use the water-soluble cellulose ether component before it has been desalted, it is recommended to carry out the process mainly as part of a process for the preparation of methyl cellulose. The best procedure to adopt then consists of mixing the methyl cellulose component before it has been desalted with the polymer already containing the linking substance and homogeneously stirring the mixture to bring about a uniform chemical reaction to produce the macromolecular substance according to the invention from the methyl cellulose component, the linking component and the polymer component, and then to wash, dry and grind the reaction product and sieve it to separate the required particle sizes.

This modified procedure is particularly advantageous if the methyl cellulose component is in the form of an aqueous suspension of methyl cellulose fibres at a concentration of 11 to 13% by weight having an atro-solid content of 50 to 55% by weight and accordingly containing 50 to 45% by weight of impurities in the form of salts carried in by the manufacturing process. This so-called crude methyl cellulose mass is then brought into contact with the cross-linking agent and the polymer, the molar percentage of cross-linking agent, based on the sum of mols of monomer units in the polymer and mols of cross-linking agent being 1.4 to 20 mol % (most preferably 2.78 to 11.1 mol %) and the percentage by weight of polymer, based on the total weight of methyl cellulose and polymer, being 1 to 20% by weight (most preferably 3.45 to 20% by weight). These three components are reacted together by continuously stirring to homogenise them for 2.5 to 3.5 hours most preferably 3 hours at a temperature of 80° to 90° C. preferably 82° to 85° C. at an alkaline pH range of 9.0 to 12, most preferably 10.0 to 11.0 optionally in an atmosphere of inert gas. The reaction product according to the invention formed in this manner is then washed at least once with hot water at 80° to 95° C. preferably 85° to 90° C., to purify it and then dried at a temperature of 75° to 85° C., most preferably 78° to 82° C., and converted into the completely water-soluble macromolecular substance suitable for use by grinding it down to a particle size of 0.1 to 250μ most preferably 20 to 100μ.

In this way one obtains macromolecular substances which show a considerable increase, particularly of the water retention capacity. Thus one can assume the the original structure of the cellulose ether according to the invention, however, it is assumed that the original structure of the cellulose ether is "loosened up" by the chemical addition of the polymers to the cellulose ethers by means of the linking agent and/or by a form of polymer bridge building between individual cellulose ether chains. It may be that due to the resulting three-dimensional "enlargement" of the modified structure according to the invention, which may be due to a "non-compatibility" of the differing macromolecular chains, individual parts of the modified chains move further apart from each other under the action of water, so that a larger quantity of water can be taken up and bound than is possible when unmodified cellulose ether is used. It is suspected that under suitable reaction conditions, the first chemical addition of the linking agent to the cellulose ether is followed immediately by the second reaction, i.e. the chemical addition of the linking agent to the polymer. Using the partial structural formula already given in this description, the synthesis of the macromolecular substance according to the invention could conceivably take place in accordance with the following two models:

1. Cellulose ether —O— linking agent-polymer
2. Cellulose ether —O— linking agent-polymerlinking agent —O— cellulose ether.

The suprising finding that sodium hypochlorite could also be used as linking agent led one to propose the following reaction which might possibly take place when NaOCl is used as linking agent and polyacrylamide as polymer:

The above reaction scheme shows that the end product obtained according to the invention has a slightly different macromolecular structure when NaOCl is used as linking agent.

As will be seen in the Examples given in this description, the particularly advantageous parameters of the macromolecular substance prepared according to the invention render it particularly suitable for use as an additive in building materials. Due to the exceptionally good capacity for dispersion and suspension of the macromolecular substance according to the invention, it can be better and more uniformly distributed in building materials such as mortar or cement.

At the same time, the product according to the invention shows particularly advantageous flow properties which have the desirable characteristic of increasing the length of time during which a building material containing this product remains in a fluid and spreadable state. Added to the above mentioned advantageous parameters, however, is the particularly important and hitherto virtually unattained water-retention capacity of the macromolecular substance according to the invention, which optimally increases the so-called "open assembly time" of building materials containing it. This "open assembly time" is necessary for having more time available for levelling out and smoothing the surface, e.g. of plaster work. Another considerable advantage which should be mentioned at this point is the effectiveness of the substance, since quantities of only 0.05 to 3% by weight, based on the total solid substance, are sufficient to produce the desired effects described above when added to dry plaster powder based on gypsum. When the macromolecular substance according to the invention is added to dry plaster powder based on cement, quantities of 0.02 to 2% by weight, based on the total solid substance, are generally sufficient to produce the advantageous effects described above. When the macromolecular substance according to the invention is used as additive to cement mortar, it is generally preferred to use it in quantities of 0.03 to 4% by weight, based on the total solid substance of this building material.

Apart from this preferred use of the macromolecular substance according to the invention, it may also be used inter alia as thickener for stabilizing dispersions, for improving the flow of liquid aqueous media by thickening, as flocculating agent for fluid physichemically non-uniform substances which are required to be separated, and as flocculating agent for working up inorganic and organic sludges.

The wide range of uses of the macromolecular substance according to the invention indicated above are not restricted to the above mentioned fields of application but extend to all of those uses where products with the described parameters are required.

Whereas Examples A-1 and B-1 are described in detail, the subsequent Examples are represented in an abbreviated, tabular form since they were carried out under the same conditions as Examples A-1 and B-1. For completeness of the survey of all the Examples given here, Examples A-1 and B-1 described in the text are also included in the Table.

For reasons of space, the names of substances written in full in Examples A-1 and B-1 described in the text are abbreviated in the Tables. The abbreviation for the chemical starting materials will therefore be given now, together with some information on the concentration of these substances and the media in which they are dissolved.

CD = cellulose derivative
P = polymer.

1. : CD-1:
   Methyl cellulose, commercial, trade name Walocel M ®, average degree of polymerisation 1.4 to 2.0; viscosity of the 2% aqueous solution determined in the Rotovisko MV II of Hake at a throughflow time of $D=2.55$ sec$^{-1}$: 10,000 cp; but without drying and grinding, in the flocculated state (taken from production) with a water content of about 45% by weight.

2. CD-2:
   Methyl cellulose as under CD-1 but with a viscosity of 3,000 cp.

3. CD-3:
   Hydroxyethyl cellulose (HEC), a commercial product of Hercules (Natrosol 250 M ®).

4. CD-4:
   Hydroxypropylmethyl cellulose (HPMC), a commercial product, Walocel M ®, average degree of substitution about 1.6; viscosity of the 2% aqueous solution determined as for CD-1 in a Rotovisko MV II apparatus of Hake at a throughflow speed of $D=2.55$ sec$^{-1}$: about 8,000 cp, but without drying and grinding in the flocculated state (taken from production), water content about 40% by weight.

5. CD-5:
   Carboxymethylcellulose (CMC), trade name Antisol THS ®, average degree of substitution: 0.85; viscosity of 3% aqueous solution (determined as under CD-1): about 8,000 cp ($D=2.72$ sec$^{-1}$); but without drying and grinding in the flocculated state (taken from production) with an active content (term familiar in the art of CMC) of 45 to 50%.

6. CD-6:
   6.5% by weight aqueous methyl cellulose suspension containing NaCl (at temperatures above 70° C.). The product otherwise corresponds to methyl cellulose described under CD-1 above.

7. CD-7:
   6.5% by weight aqueous methyl cellulose suspension containing NaCl (at temperatures above 70° C.): this methyl cellulose otherwise corresponds to the product mentioned under CD-2.

8. P-1:
   High molecular weight polyacrylamide homopolymer according to German Auslegeschrift No. 2,545,007; Molecular weight about $3 \times 10^7$.

9. P-2:
   Polyacrylamide homopolymer prepared by the usual technique of radical polymerisation; molecular weight about $5 \times 10^5$.

10. P-3:
    Copolymer of acrylamide/acrylic acid/maleic acid anhydride monomers prepared by radical copolymerisation, using an initial ratio of monomers of 3:1:1; molecular weight about $1 \times 10^6$.

11. P-4:
    Graft polymer of acrylamide on methyl cellulose in proportions of 3:1 using radical grafting with cerium-IV salts followed by hydrolysis with about 40% acid groups and a viscosity of 5000 cp (determined in a 1% solution in the Rotoviscosimeter of Hake at a throughflow velocity of $D=2.55$ sec$^{-1}$).

12. P-5:
    A mixture of polyacrylamide corresponding to the substance described under P-1 and a commercial polyvinyl alcohol. The two products are mixed in proportions of 1:1; viscosity of polyvinyl alcohol: 27 to 33 cp determined as 4% aqueous solution at 20° C. in a Höppler viscosimeter at a degree of hydrolysis of 87 to 89 mol %.

13. P-6:
    A mixture of polyacrylamide corresponding to the substance described under P-1 and a commercial polydiol having a molecular weight of about 1000, mixed in proportions of about 1:1.

14. P-7:
    Commercial graft copolymer of acrylamide and acrylic acid on methyl cellulose in proportions of 3:1:1; radical grafting by means of cerium-IV salts; viscosity of product: 4,500 cp (determined on a 1% solution in the Rotoviscosimeter at a throughflow velocity D of 2.55 sec$^{-1}$).

15. P-8:
    Commercial polyacrylamide homopolymer having a molecular weight of $1 \times 10^7$ (trade name: Praestol 3000/74).

16. P-9:
    Commercial polyacrylamide polymer having a molecular weight of about $6 \times 10^6$ and an acid group content of about 35% (Praestol 2850 ®.

17. P-10:
    Copolmer of acrylonitrile, acrylamide and acrylic acid in proportions of 3:2:1 prepared by radical copolymerisation followed by hydrolysis with about 35% acid groups and a molecular weight of about $4 \times 10^6$.

18. P-11:
    Commercial epoxide resin in the form of a condensation product of bisphenol A and epichlorohydrin, trade product of Shell under the trade name Epicote 827 ®.

19. GBAM:
    Abbreviation used in the following Tables for "glyoxal-bis-acrylamide".

20. TaOE:
    Abbreviation used in the following Tables for "tetraallyloxyethane".

21. NaOCl:
    Abbreviation used in the following Tables for: "Sodium hypochlorite".

In the products mentioned under CD-6 and CD-7, methyl cellulose is in the form of a suspension because it is not soluble in water at temperatures above 70° C. Below 70° C., it is in the form of an aqueous solution because it is water-soluble at these temperatures.

In all of the examples which follow, the macromolecular product produced and used according to the invention is ground down because it is even more readily soluble in water in this form.

The examples according to the invention now follow. Those that relate to the preparation of the macromolecular substance according to the invention in a kneader, i.e. using a cellulose ether which has already been desalted, are listed under the consecutive numbers A-1 to A-38. All other Examples relating to the preparation of the macromolecular substance according to the invention in a scrubber, i.e. before removal of the reaction salts from the crude cellulose ether by washing, carry the consecutive numbers B-1 to B-10. The examples of practical application carrying the consecutive numbers C-1 to C-19 are summarized in Table 3.

EXAMPLE A-1:

95.84% by weight of a commercial methyl cellulose (Walsroder MC ®) which has been neither dried nor ground but is in a floccular state and has a residual water content of 45% by weight after removal of the salt is thoroughly kneaded in a conventional laboratory kneader (also known as moist mixer) and adjusted to a temperature of 80° C. A separately prepared mixture of 287.24 g of a 5% by weight aqueous polyacrylamide solution containing 4.16% by weight of polyacrylamide in the whole mixture and 0.74 g of epichlorohydrin corresponding to 3.84 mol %, based in the sum of mols of cross-linking agent and of monomer units in the polymer is then slowly added to the aforesaid quantity of commercial homogenised methyl cellulose in the kneader and the three components are uniformly distributed and thoroughly homogenised by kneading. At the same time the temperature of the whole mixture, which has meanwhile dropped as a result of the addition of this mixture, is raised to 80° C. under continued operation of the kneader, and the chemical addition and linking reaction linking the three components together are carried to completion with continued kneading within 3 hours. To prevent undesirable side reactions, the space in the kneader which is free from product is kept supplied with nitrogen throughout the reaction time. After completion of the reaction, the resulting macromolecular product according to the invention is removed from the kneader and left at room temperature for 24 hours. The macromolecular substance is then dried for 11 hours in a conventional circulating air drying cupboard at 70° C. and ground down to an average particle size of 63 μm in the usual manner. The finished product is soluble in water and has an excellent water-retention capacity (see Example C-4).

Examples A-2 to A-37 according to the invention shown in Table 1 below were carried out by basically the same method, using the same operating conditions as in Example 1. The particulars given in Example A-1 will therefore not be repeated.

In all those cases in which modification according to the invention of the cellulose ether is carried out, not in a kneader but in a scrubber as part of a conventional commercial process for the production of cellulose ether, it is advisable to proceed as described in the Example series B-1 to B-10. In these Examples, temperatures of 80° to 90° C. which in any case prevail in the scrubber as part of the usual method of preparation and which are also necessary for the modification of the cellulose ether according to the invention serve to save considerable quantities of time and energy.

EXAMPLE B-1:

6,000 g of a 6.5% by weight suspension of crude methyl cellulose containing NaCl, abbreviated as CD-6 in the following Table, is introduced into a heatable stirrer vessel and heated to 85° C. The pH of the suspension is then adjusted to 10.5 with sodium hydroxide solution. A mixture is prepared separately from 556.6 g of a 5% by weight aqueous solution of a graft polymer named P-4 and having the composition indicated under the serial number 11 in the following Table, and 1.07 g of epichlorohydrin. This previously prepared mixture of components is then added to the aqueous methyl cellulose suspension with stirring and maintained at 85° C. with continuous stirring for 3 hours. The resulting macromolecular substance according to the invention is then filtered and washed three times, each time with 1000 ml of water at 90° C., and the residual water left behind is removed by a vacuum produced by a water jet pump. The purified macromolecular substance obtained after suction filtration and washing is spread out on a plate and thoroughly dried in a circulating air drier cupboard at 80° C. for 11 hours and finally ground to an average particle size of 63 μm by the usual process.

Both the macromolecular product according to the invention prepared as described in Example A-1 and that prepared according to Example B-1 were completely water-soluble and had an excellent water-retention capacity (see Examples C-4 and C-17 in Table 3).

There now follows Table 1 containing Examples A-1 to A-37 and Table 2 containing Examples B-1 to B-10.

TABLE 1

| | | | | (A) Examples for modification in the kneader: | | | | |
|---|---|---|---|---|---|---|---|---|
| | | | | | | Reaction conditions | | |
| Example No. | Cellulose derivative | Polymer | Polymer % by weight as mixture | Polymer % by weight based on atro total mixture | Cross-linking agent Type of Linkage | Quantity of linkage in mol % | Temperature in °C. | pH | Time in hours |
| A-1 | CD-1 | P-1 | — | 4.16 | Epichlorohydrin | 3.84 | 80 | 10.5 | 3 |
| A-2 | CD-1 | P-1 | — | 6.80 | Epichlorohydrin | 3.22 | 85 | 11.0 | 3 |
| A-3 | CD-1 | P-1 | — | 5.26 | Epichlorohydrin | 6.25 | 72 | 10.0 | 3 |
| A-4 | CD-1 | P-1 | — | 3.50 | Epichlorohydrin | 2.77 | 75 | 10.0 | 3 |
| A-5 | CD-1 | P-1 | — | 3.50 | Epichlorohydrin | 1.40 | 90 | 12.0 | 6 |
| A-6 | CD-1 | P-1 | — | 12.50 | Epichlorohydrin | 6.25 | 78 | 10.5 | 3 |
| A-7 | CD-1 | P-1 | — | 9.84 | Epichlorohydrin | 14.30 | 72 | 10.0 | 3 |
| A-8 | CD-1 | P-1 | — | 3.50 | Glyoxal | 3.84 | 75 | 10.5 | 3 |
| A-9 | CD-1 | P-1 | — | 6.80 | Glyoxal | 3.22 | 68 | 10.0 | 6 |
| A-10 | CD-1 | P-2 | — | 3.50 | Glyoxal | 3.84 | 70 | 10.0 | 6 |
| A-11 | CD-1 | P-3 | — | 3.50 | Glyoxal | 3.84 | 70 | 10.5 | 6 |
| A-12 | CD-1 | P-2 | — | 4.50 | Epichlorohydrin | 6.25 | 78 | 10.5 | 3 |
| A-13 | CD-1 | P-4 | — | 4.50 | Epichlorohydrin | 3.84 | 80 | 10.5 | 3 |
| A-14 | CD-1 | P-10 | — | 4.50 | Epichlorohydrin | 3.84 | 80 | 10.5 | 3 |
| A-15 | CD-2 | P-7 | — | 5.26 | Epichlorohydrin | 3.84 | 80 | 10.0 | 3 |
| A-16 | CD-1 | P-1 | 92.3 | 3.84 | NaOCl | 6.25 | 85 | 10.5 | 3 |
| | | P-11 | 7.7 | | | | | | |
| A-17 | CD-1 | P-1 | 82.2 | 3.84 | NaOCl | 6.25 | 85 | 11.0 | 3 |
| | | P-11 | 3.8 | | | | | | |

TABLE 1-continued (A) Examples for modification in the kneader:

| Example No. | Cellulose derivative | Polymer | Polymer % by weight as mixture | Polymer % by weight based on atro total mixture | Cross-linking agent Type of Linkage | Quantity of linkage in mol % | Temperature in °C. | pH | Time in hours |
|---|---|---|---|---|---|---|---|---|---|
| A-18 | CD-1 | P-1 | 97.6 | 3.84 | NaOCl | 6.25 | 85 | 10.5 | 3 |
|  |  | P-11 | 2.4 |  |  |  |  |  |  |
| A-19 | CD-1 | P-1 | 92.3 | 6.25 | NaOCl | 3.84 | 85 | 10.5 | 3 |
|  |  | P-11 | 7.7 |  |  |  |  |  |  |
| A-20 | CD-2 | P-1 | 92.3 | 3.84 | NaOCl | 6.25 | 85 | 10.5 | 3 |
|  |  | P-11 | 7.7 |  |  |  |  |  |  |
| A-21 | CD-1 | P-8 | — | 3.84 | NaOCl | 6.25 | 85 | 10.5 | 3 |
| A-22 | CD-1 | P-1 | — | 4.16 | NaOCl | 3.84 | 85 | 10.5 | 3 |
| A-23 | CD-1 | P-2 | — | 5.26 | NaOCl | 3.84 | 80 | 11.0 | 3 |
| A-24 | CD-1 | P-10 | — | 4.16 | Epichlorohydrin | 6.25 | 85 | 10.5 | 3 |
| A-25 | CD-1 | P-9 | — | 4.16 | Epichlorohydrin | 6.25 | 88 | 11.0 | 3 |
| A-26 | CD-3 | P-1 | 50 | 4.76 | NaOCl | 3.84 | 80 | 10.0 | 4 |
|  |  | P-11 | 50 |  |  |  |  |  |  |
| A-27 | CD-4 | P-1 | 90 | 4.76 | NaOCl | 3.84 | 80 | 10.5 | 4 |
|  |  | P-11 | 10 |  |  |  |  |  |  |
| A-28 | CD-4 | P-2 | 80 | 4.76 | Epichlorohydrin | 3.84 | 85 | 10.5 | 3 |
|  |  | P-11 | 20 |  |  |  |  |  |  |
| A-29 | CD-1 | P-2 | — | 6.25 | G-BAM | 3.84 | 90 | 11.0 | 6 |
| A-30 | CD-5 | P-10 | — | 6.25 | Glyoxal | 6.25 | 90 | 11.0 | 6 |
| A-31 | CD-2 | P-9 | — | 6.25 | Epichlorohydrin | 3.84 | 85 | 10.5 | 4 |
| A-32 | CD-1 | P-5 | — | 6.25 | Epichlorohydrin | 3.84 | 80 | 11.0 | 3 |
| A-33 | CD-1 | P-6 | — | 5.26 | Epichlorohydrin | 3.84 | 80 | 11.0 | 3 |
| A-34 | CD-1 | P-8 | — | 5.26 | NaOCl | 3.84 | 85 | 10.5 | 3 |
| A-35 | CD-1 | P-1 | — | 5.26 | Glutaric dialdehyde | 5.26 | 80 | 10.5 | 3 |
| A-36 | CD-1 | P-1 | — | 5.26 | Glycidylmethacrylate | 5.26 | 90 | 10.5 | 6 |
| A-37 | CD-1 | P-7 | — | 4.76 | TAoE | 3.84 | 90 | 11.0 | 6 |

TABLE 2

Examples for modification in the scrubber

| Example No. | Types of MC | Types of Polymer | Polymer % by weight in total mixture |
|---|---|---|---|
| B-1 | CD-6 | P-4 | 6.66 |
| B-2 | CD-6 | P-4 | 8.33 |
| B-3 | CD-6 | P-4 | 3.45 |
| B-4 | CD-6 | P-4 | 20.00 |
| B-5 | CD-6 | P-1 | 6.66 |
| B-6 | CD-6 | P-8 | 6.66 |
| B-7 | CD-6 | P-10 | 6.66 |
| B-8 | CD-6 | P-1 | 6.66 |
| B-9 | CD-7 | P-1 | 6.66 |
| B-10 | CD-6 | P-1 | 6.66 |

| Example No. | Type of cross-linking agent | Quantity in mol % | Temp in °C. | pH | Time in hours |
|---|---|---|---|---|---|
| B-1 | Epichlorohydrin | 3.8 | 85 | 10.5 | 3 |
| B-2 | Epichlorohydrin | 6.25 | 85 | 11.0 | 3 |
| B-3 | Epichlorohydrin | 11.1 | 85 | 10.0 | 3 |
| B-4 | Epichlorohydrin | 2.78 | 85 | 10.5 | 3 |
| B-5 | Epichlorohydrin | 4.76 | 82 | 11.0 | 3 |
| B-6 | Epichlorohydrin | 4.76 | 85 | 10.5 | 3 |
| B-7 | Epichlorohydrin | 4.76 | 85 | 10.5 | 3 |
| B-8 | Glyoxal | 4.76 | 82 | 10.5 | 3 |
| B-9 | Glyoxal | 4.76 | 85 | 11.0 | 3 |
| B-10 | NaOCl | 4.76 | 85 | 10.5 | 3 |

From the large number of macromolecular substances according to the invention which are also prepared according to the invention, a portion is selected and compared with the commercial known art products at present available on the market to demonstrate the superiority of the products according to the invention in their most important property for the building industry, namely their water-retention capacity.

Figure 1:
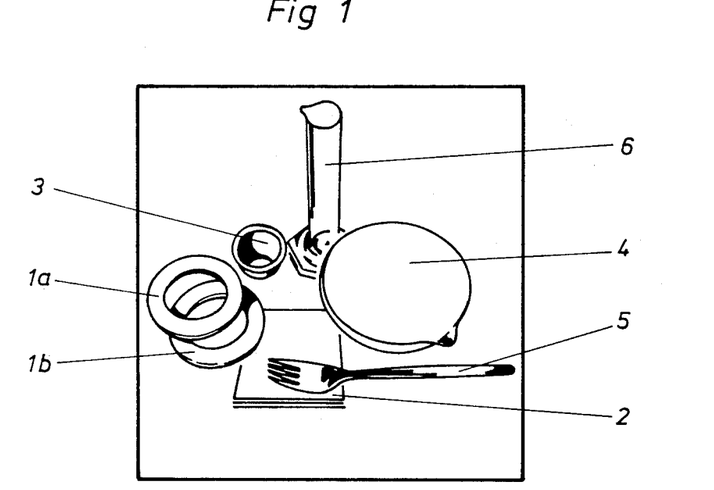

To carry out these comparisons, a standard method, the so-called Wolff-Walsrode method, is used to determine the water retention capacity. The apparatus illustrated in FIG. 1 and summerised below are used:

1a: metal ring;
1b: metal ring;
2: chromatographic paper;
3: rubber cone;
4: porcelain dish;
5: stirring fork;
6: measuring cylinder (graduated).

Figure 2:
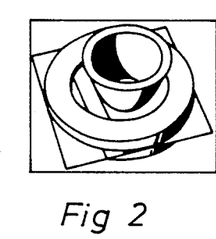

FIG. 2 shows the above apparatus arranged for the test.

Figure 3:
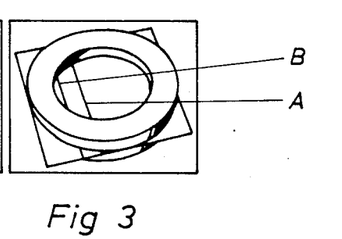

FIG. 3 shows the paper chromatography waterflow fronts A and B necessary for the test.

The method of carrying out the test is described below with reference to the above mentioned FIGS. 1 to 3.

The chromatographic paper 2 is first placed between the rings 1a and 1b. The rubber cone 3 is then placed on the paper with its smaller external diameter touching the flow front line A. Water at a temperature of about 20° C. is then introduced into the porcelain dish 4 in a quantity of either 28 ml for the gypsum plaster test and 18 or 20 ml for the cement plaster test. Measuring cylinder 6 is used for measuring these quantities of water.

50 g of dry plaster based on gypsum containing 70% by weight of plaster of Paris (manufacturers: Dr. Wirt), 26% by weight of lime sand with a particle size of 0.2 mm (manufacturers: Lonza) and 4% by weight of calcium hydroxide are then mixed with 0.1 g of the macromolecular substance according to the invention. When dry plaster based on cement is used, consisting of 15% by weight of cement (Portland cement PZ 350), 75% by weight of quartz sand (manufacturers: Westdeutsche Quarzsandwerke Dr. Müller of Dorsten) and 10% by weight of calcium hydroxide 0.05 g of the macromolecular substance according to the invention is added. In both cases, the dry plaster is carefully mixed with the macromolecular substance according to the invention and introduced into the water provided in the quantity mentioned above. Instead of the given quantity of macromolecular substance according to the invention (see Table 3, Examples C-4 to C-19), the same quantity, i.e. 0.1 and 0.05 g, respectively, of cellulose ether is added in comparison Examples C-1, C-2 and C-3 shown in Table 3 and all of the experiments are, of course, carried out under the same experimental conditions described below.

The waterfront starting line A shown in FIG. 3 and the waterfront target line B also shown there represent the path through which the waterfront must travel in the chromatographic paper. The time taken for the front to travel through this distance is a measure of the water retention capacity. The water is first thoroughly incorporated in the plaster by stirring with fork 5 for 25 seconds and the resulting mixture is then introduced into the rubber cone and the stopwatch is started. The mixture of plaster and water must have the correct consistency to make it possible for the surface of paper within the cone to be completely wetted.

As soon as the waterfront in chromatographic paper 2 has reached the target line B, the stopwatch must be stopped. The time measured between the starting point at line A and the finishing point at line B is the pure travelling time entered in the following Table. In cases where the water and plaster are first mixed for 25 seconds with the aid of the fork and the stopwatch is not started until the mixture has been introduced into the rubber cone, these 25 seconds of stirring must be subtracted. It is obvious that one must decide on one or other of the two methods and keep to that method for all the examples. In the present case, the second method was preferred, i.e. the stopwatch was started before the mixture was stirred for 25 seconds, and the stirring time was then subtracted from the total time indicated on the stopwatch so that the remainder, which is the pure travelling time, is entered in Table 3.

TABLE 3

Water retention tests; investigations carried out by the method of Wolff Walsrode described above.

| Ex. No. | Cellulose ether product | Water retention capacity in gypsum plaster | | Water retention capacity in cement plaster | |
|---|---|---|---|---|---|
| | | 28 ml water in sec. | 32 ml water in sec. | 18 ml water in sec. | 20 ml water in sec. |
| C-1 | Methyl cellulose; commercial product, Walocel M ® | 330 | 185 | 212 | 155 |
| C-2 | Methyl cellulose; commercial product of Hoechst AG, Tylose S 15000X ® | 400 | — | 295 | |
| C-3 | Methyl cellulose; commerical product of Henkel/Dusseldorf, Culminal C 6070/15 ® | 685 | 291 | 480 | 270 |
| C-4 | Product A-1 according to the invention | 1500 | 470 | 635 | 392 |
| C-5 | Product A-2 according to the invention | 1680 | 410 | 594 | 380 |
| C-6 | Product A-4 according to the invention | 1540 | 448 | 553 | 425 |
| C-7 | Product A-9 according to the invention | 1546 | 409 | 600 | 440 |
| C-8 | Product A-12 according to the invention | 1280 | 375 | 520 | 340 |
| C-9 | Product A-16 according to the invention | 1500 | 833 | 1500 | 680 |
| C-10 | Product A-17 according to the invention | 1500 | 748 | 1500 | 1007 |
| C-11 | Product A-19 according to the invention | 1800 | 1228 | 1500 | 1130 |
| C-12 | Product A-27 according to the invention | 1500 | 708 | 1500 | 700 |
| C-13 | Product A-24 according to the invention | 1500 | 690 | 890 | 565 |
| C-14 | Product A-25 according to the invention | 1580 | 500 | 755 | 490 |
| C-15 | Product A-15 according to the invention | 1500 | 825 | 1500 | 645 |
| C-16 | Product A-38 according to the invention | 1800 | 940 | 1500 | 890 |
| C-17 | Product B-1 according to the invention | 1310 | 390 | 585 | 370 |
| C-18 | Product B-5 according to the invention | 1220 | 355 | 570 | 352 |
| C-19 | Product B-8 according to the invention | 1405 | 430 | 610 | 412 |

When the numerical results of comparison experiments C-1, C-2 and C-3 shown in Table 3 are compared with the numerical results of experiments C-4 to C-19 according to the invention, it is clearly seen that the products according to the invention A-1 to B-8 selected are considerably superior to the commercial products in their water-retention capacity. This remarkable superiority of the products according to the invention is found both in the tests with gypsum plaster and in the tests with cement plaster. All of the results were obtained with a uniform chromatographic paper, No. 2040 b (manufacturers: Schleicher and Schüll).

What is particularly remarkable is that the superiority of the products according to the invention is independent of the method of preparation, i.e. products from the B series are as good as products from the A series. This must be regarded as further proof of the fact that within certain ranges, the parameters of the product according to the invention are independant of the process employed.

We claim:

1. A water-soluble macromolecular substance having a high capacity for dispersion, suspension and water-retention, said macromolecular substance consisting of a water-soluble cellulose ether joined via an at least bi-functional cross-linking agent to a water-soluble polymer component containing synthetic acrylic units or to said water-soluble polymer component containing synthetic acrylic units in admixture with a polymer of sodium alginate, of ethylene glycol, of propylene glycol, of vinyl alcohol or of an amide, said at least bifunctional cross-linking agent being selected from the group consisting of epichlorohydrin, glyoxal, glycidyl, paraformaldehyde, glutaric dialdehyde, maleic acid anhydride, epichlorohydrin polydiol, glycidyl methacrylate, N-methylol-acrylamide, ethylene glycol dimethacrylate, tetraallyloxyethane, tetraallyloxymethane, glyoxal-bis-acrylamide, bis-acrylamidoacetic acid, acrylamidoglycollic acid and reaction products of epichlorohydrin and bis-phenol-A.

2. A thickener for stabilizing dispersions, which comprises a macromolecular substance as claimed in claim 1.

3. An additive for improving the flow of liquid aqueous media by thickening them, which comprises a macromolecular substance as claimed in claim 1.

4. A flocculant for fluid physicochemically nonuniform substances which are to be separated, which comprises a macromolecular substance as claimed in claim 1.

5. A flocculant for working up inorganic and organic sludges, which comprises a macromolecular substance as claimed in claim 1.

6. A water-soluble macromolecular substance of claim 1 wherein the proportion of the at least bi-functional cross-linking component, based on the monomer units of the polymer is 1 to 25 mol %.

7. A water-soluble macromolecular substance of claim 6 wherein the proportion of the at least bi-functional cross-linking component is 1.4 to 20 mol %.

8. A water-soluble macromolecular substance of claim 1 wherein the water-soluble cellulose ether is selected from the group consisting of methyl cellulose, hydroxyethyl cellulose, hydroxypropyl methyl cellulose and carboxymethyl cellulose and the water-soluble polymer component containing synthetic acrylic units is a substance comprising structural units selected from the group consisting of homopolymers and copolymers of acrylamide, acrylamide derivatives, acrylic acid, methacrylic acid, 2-acrylamido-2-methylpropane-sulphonic acid, vinyl caprolactam, vinylpyrrolidone, acrylic acid esters, methacrylic acid esters, acrylonitrile, partly hydrolyzed acrylonitrile, acrylonitrile drivatives, graft copolymers of acrylamide on methyl cellulose and graft polymers of acrylamide and acrylic acid on methyl cellulose.

9. A water-soluble macromolecular substance of claim 1 wherein the proportions of the water-soluble polymer component containing synthetic acrylic units, based on the total weight of the cellulose ether component and said polymer component is 1 to 25% by weight.

10. A water-soluble macromolecular substance of claim 9 wherein the proportion of said polymer component is 1.8 to 9.0% by weight.

11. An additive for improving dry-plaster compositions based on gypsom comprising a water-soluble macromolecular substance of claim 1.

12. An additive for improving dry-plaster compositions based on cement comprising a water-soluble macromolecular substance of claim 1.

13. An additive for improving dry-plaster compositions based on cement mortar comprising a water-soluble macromolecular substance of claim 1.

* * * * *